United States Patent [19]

Pesheck et al.

[11] Patent Number: 5,576,036
[45] Date of Patent: Nov. 19, 1996

[54] PRE-BAKED MICROWAVEABLE PASTRY SYSTEMS

[75] Inventors: Peter S. Pesheck; Tammy McIntyre, both of Minneapolis; Liza Levin, Plymouth, all of Minn.

[73] Assignee: The Pillsbury Company, Minneapolis, Minn.

[21] Appl. No.: 372,844

[22] Filed: Jan. 13, 1995

Related U.S. Application Data

[63] Continuation of Ser. No. 954,756, Sep. 30, 1992, abandoned.

[51] Int. Cl.$^6$ .................................................. A21D 13/00
[52] U.S. Cl. ........................... 426/94; 426/237; 426/243; 426/549; 426/556
[58] Field of Search ........................... 426/94, 549, 556, 426/243, 246, 237

[56] References Cited

U.S. PATENT DOCUMENTS

| | | |
|---|---|---|
| 3,257,214 | 6/1966 | McDermott . |
| 3,397,064 | 8/1968 | Matz . |
| 3,480,450 | 11/1969 | Edlin et al. . |
| 3,524,401 | 8/1970 | Hosfield et al. . |
| 3,879,563 | 4/1975 | Tucker et al. . |
| 3,911,155 | 10/1975 | Ferrero ................................... 426/296 |
| 3,969,340 | 7/1976 | Tessler . |
| 4,068,009 | 1/1978 | Rispoli et al. ........................... 426/293 |
| 4,145,451 | 3/1979 | Oles . |
| 4,220,671 | 2/1980 | Kahn et al. . |
| 4,255,456 | 3/1981 | Arendt ....................................... 426/64 |
| 4,291,066 | 9/1981 | Anema et al. . |
| 4,297,378 | 10/1981 | Haasl et al. . |
| 4,426,395 | 1/1984 | Sakai et al. . |
| 4,487,786 | 12/1984 | Junge . |
| 4,526,801 | 7/1985 | Atwell . |
| 4,529,607 | 7/1985 | Lenchin et al. . |
| 4,568,555 | 2/1986 | Spanier . |
| 4,595,597 | 6/1986 | Lenchin et al. . |
| 4,597,974 | 7/1986 | Fonteneau et al. . |
| 4,597,976 | 7/1986 | Doster et al. . |
| 4,675,197 | 6/1987 | Banner et al. . |
| 4,744,994 | 5/1988 | Bernacchi et al. . |
| 4,755,392 | 7/1988 | Banner et al. . |
| 4,778,684 | 10/1988 | D'Amico et al. . |
| 4,834,995 | 5/1989 | Canzoneri ................................. 426/94 |
| 4,844,919 | 7/1989 | Szwerc ...................................... 426/94 |
| 4,929,455 | 5/1990 | Connaughton et al. ................. 426/94 |
| 5,008,124 | 4/1991 | Wilson . |
| 5,009,903 | 4/1991 | de Figueredo et al. ................ 426/243 |
| 5,104,669 | 4/1992 | Wolke et al. ............................. 426/94 |
| 5,194,271 | 3/1993 | Yasosky .................................... 426/94 |

FOREIGN PATENT DOCUMENTS

| | | |
|---|---|---|
| 0155760 | 9/1985 | European Pat. Off. . |
| 0327332 | 8/1989 | European Pat. Off. . |
| 0530014 | 3/1993 | European Pat. Off. . |
| 889642 | 1/1944 | France . |
| 8501188 | 3/1985 | WIPO . |

OTHER PUBLICATIONS

A—Chapter 32 from Bakery Technology and Engineering, by Matz, "Fryers and Frying", pp. 700–716.
B—Chapter 31 from Bakery Technology and Engineering, by Matz, "Ovens and Baking", pp. 680–699.
Kirk Othmer, *Encyclopedia of Chemical Technology*, "Starch", 21:492–507 (3rd Ed.).
Kirk Othmer, *Encyclopedia of Chemical Technology*, "Bakery Processes and Agents", 3:438–457 (3rd Ed.).
Kirk Othmer, *Encyclopedia of Chemical Technology*, "Food Additives", 3:146–163 (3rd Ed.).
Messina & Pape, "Ingredient Cuts Heat–Process Time", *Food Engineering*, 48–51, Apr. 1966.
Hawley, G. G., *The Condensed Chemical Dictionary*, 1981, p. 552, Van Nostrand Reinhold Co., New York.

*Primary Examiner*—Esther Kepplinger
*Assistant Examiner*—Lien Tran
*Attorney, Agent, or Firm*—Merchant, Gould, Smith, Edell, Welter & Schmidt, P.A.

[57] ABSTRACT

A pre-baked microwaveable dough composition comprising a dough of flour, plasticizer, water, and a leavening agent; a crisping agent dispersed across the dough; and, optionally, a topping wherein said dough comprises from about 0 wt-% to 50 wt-% water and from about 15 wt-% to 35 wt-% plasticizer. The invention also comprises a method of preparing a pre-baked microwaveable dough composition.

17 Claims, 2 Drawing Sheets

Map of Bread Fat and Dough H2O/Flour Ratio

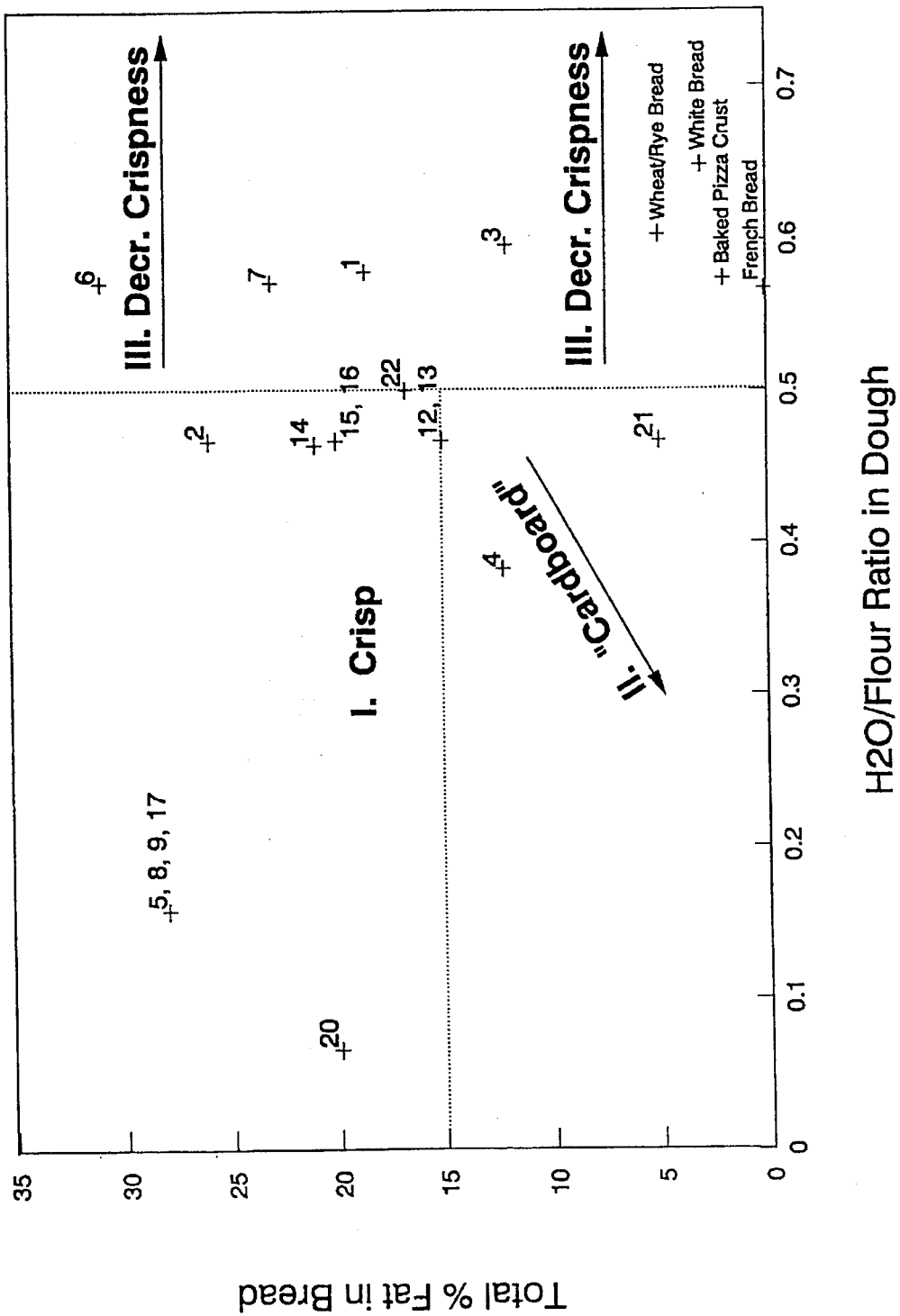
FIG. 1 Map of Bread Fat and Dough H2O/Flour Ratio

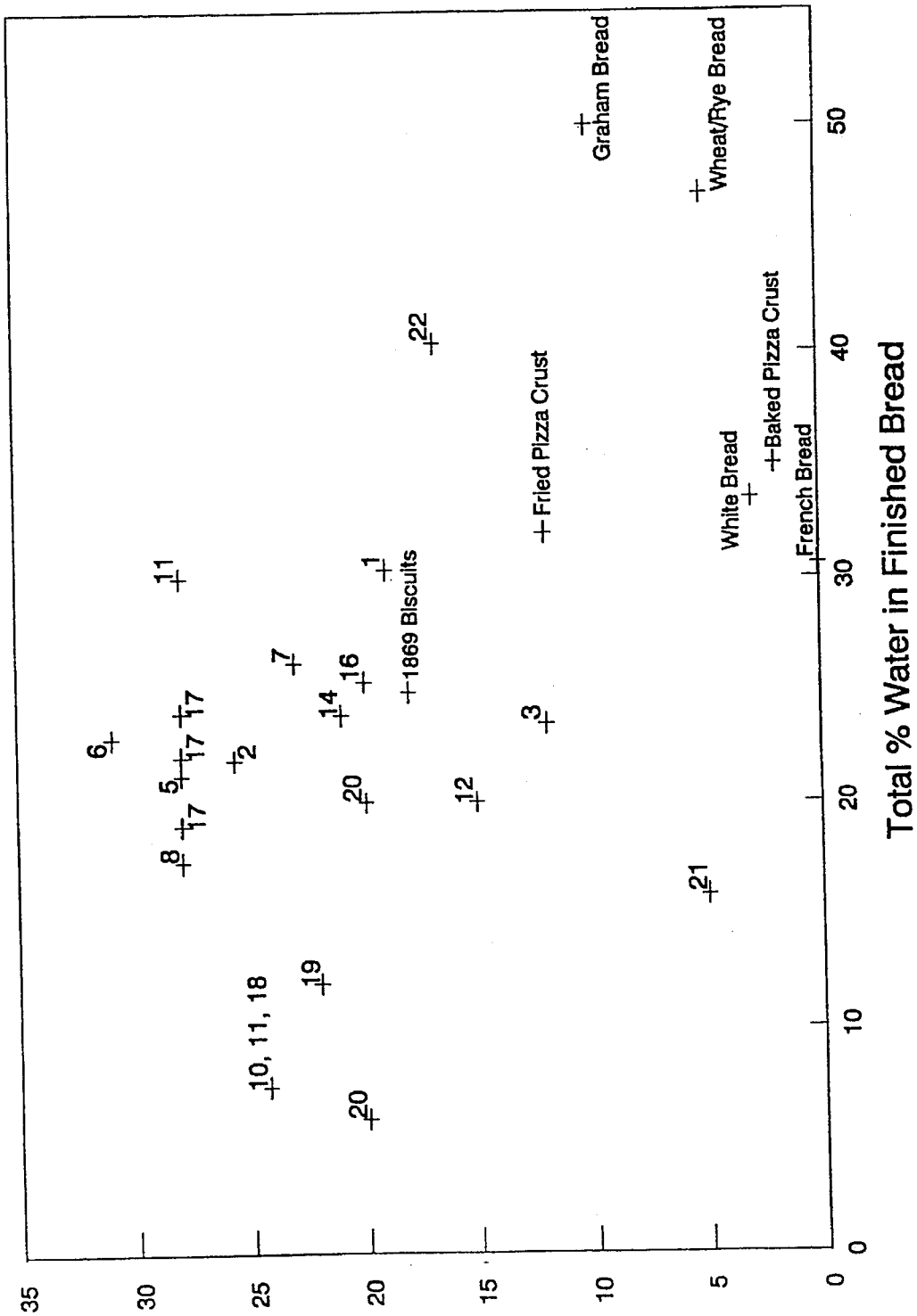

PRE-BAKED MICROWAVEABLE PASTRY SYSTEMS

This application is a continuation of Ser. No. 07/954,756 filed Sep. 30, 1992 which has been abandoned.

FIELD OF THE INVENTION

The invention generally relates to pre-baked microwaveable pastry systems. More specifically, the invention relates to previously baked coated dough systems which are microwaveable without a microwave susceptor to produce a foodstuff of varying texture and consistency.

BACKGROUND OF THE INVENTION

Pastry mixes formulated to provide crispy products or pre-baked products when baked in a conventional oven do not always produce crispy products when microwaved. In cooking such as for example, by frying through direct flame or by baking by heated air, the heat source causes food molecules to react from the surface inward bus heating successive layers in turn. As such, the outside of a foodpiece receives more exposure to cooking temperatures than the interior of the foodstuff and a crispy outer coating can be attained.

Microwave radiation, in contrast, penetrates a foodpiece and creates molecular vibration in water as well as other polar molecules. Heat results from this molecular vibration and is generated throughout the foodpiece rather than being passed by conduction from the surface inward. Thus the food surface is heated at a rate which is roughly comparable to the heating rate at the center of the food. Therefore, if it is desirable that the food interior be tender and moist, in most foods the exterior will have the same texture. As a result, there is essentially no surface browning or crusting of the foodstuff.

Presently, there are a number of compositions and methods for coating fresh and frozen foodstuffs which are later reconstituted by microwave cooking. For example, U.S. Pat. Nos. 4,675,197 and 4,755,392 to Banner et al describe a three-component food coating composition, including a pre-dust layer, a batter layer and a breading layer, which is applied successively to raw or precooked food. Also, U.S. Pat. No. 4,778,684 to D'Amico et al discloses a two-step coating for foodstuffs which involves applying a dry predust layer to the food and then coating it with an aqueous farinaceous-based and high amylose flour-containing batter mix.

Batters for coating dough-covered foodstuffs which are frozen and later reconstituted by microwave radiation or in a conventional oven have also been formulated. U.S. Pat. No. 4,744,994 to Bernacchi et al is directed to a method for preparing batter-coated frozen comestibles by twice-coating the food with a wheat flour-shortening based batter mixture, twice-frying the foodstuff and then reconstituting it either by microwaving or baking. European Patent Application No. 89300957.1 of DCA Food Industries, Inc. discloses a process for preparing a microwaveable partially pre-cooked and pre-fried food pie which is a foodstuff enwrapped by a high fat dough containing about 13 wt-% vegetable shortening, and coated with a batter slurry formulated without the use of high amylose flour.

Butters with high amylose content have also been coated directly onto the surface of foodstuffs in an attempt to provide a crust-like coating when the foodstuff is fried end later microwaved. U.S. Pat. Nos. 4,529,607 and 4,595,597 to Lenchin et al disclose a high amylose flour-based batter for coating directly onto the surface of fresh and frozen food-stuffs such as fish, poultry, meet and vegetable products which are then partially cooked in oil, frozen, and subsequently cooked to completion by microwaving. High amylose batters have been formulated for coating dough-covered foodstuffs to provide crispy crusts when subsequently fried in oil, see U.S. Pat. No. 4,487,786 to Junga.

However, the technology including that disclosed above generally does not provide a means for attaining any variety of foodstuffs having adequate crispness and texture after microwaving. Further, the technology does not provide a means for developing any variety of foodstuffs having adequate crispness and texture after microwaving without a microwave susceptor.

SUMMARY OF THE INVENTION

In accordance with a first aspect of the invention, there is provided a pre-baked microwaveable dough composition comprising a microwaveable dough and, crisping agent, wherein the dough comprises from about 0 wt-% to 50 wt-% water and from about 15 wt-% to 35 wt-% plasticizer.

In accordance with an additional aspect of the invention, there is provided a pre-baked microwaveable dough composition comprising a dough, a crisping agent, and a topping wherein the dough comprises from about 0 wt-% to 50 wt-% water and from about 15 wt-% to 35 wt-% plasticizer.

In accordance with another aspect of the invention, there is provided a method of preparing a pre-baked microwaveable dough composition.

In accordance with the invention, the disclosed dough may be pre-baked and coated with a crisping agent. The crisping agent may be held by any number of means including chemical means such as egg albumen, starch slurries, or a batter as well as physical means such as physical pressing of the crisping agent into the dough. If a batter is used to adhere the crisping layer or as the crisping layer the product may generally be pre-fried for a period of time prior to baking.

BRIEF DESCRIPTION OF THE DRAWINGS

FIG. 1 is a compositional map of bread fat and dough $H_2O$/flour ratio, where the numbers in the Figure refer to the compositional working examples.

FIG. 2 is a compositional map of bread total fat and moisture, where the numbers in the Figure refer to the compositional working example.

DETAILED DESCRIPTION OF THE PREFERRED EMBODIMENTS

Generally, the composition of the invention comprises a pre-baked dough which additionally has an outer coating of crisping agent. The composition of the invention may comprise any number of toppings or fillings as found in the food industry and take any number of forms including a pocket pastry food product, an enrobed pastry food product, or a pan or platter-type pastry food product.

The Dough

The composition of the invention generally comprises a dough. The dough acts to provide physical stability to the foodstuff while also providing the necessary consistency and thermal stability for a foodstuff which is first baked and then microwaved. Additionally, the dough provides a medium which is preferably compatible with the foodstuff or topping with which it is combined and physically adequate to support and deliver this foodstuff or topping.

Generally, preferred doughs are leavened and have a thickness after baking ranging from about 2 millimeters to 25 millimeters, preferably about 2 millimeters to 12 millimeters, and most preferably about 2.5 millimeters to 8 millimeters allowing for an optimal balance between microwaveability and moisture attack on the outer layers of the dough. Bread thickness substantially below 2 mm may impart undesirable moisture on the outer layer of the dough and crisping layer.

The dough may comprise any number of constituents consistent with this function. Generally, the dough of the invention comprises a processed or unprocessed flour which may be either a white flour or a whole grain constituent. Grains useful for defining the dough of the invention include grain constituents such as flours, germ, and bran from wheat, oats, rye, sorghum, barley, rice, millet, and corn among others. Generally, the dough used in the invention will have flour present in a concentration ranging from about 55 wt-% to 70 wt-%, preferably about 60 wt-% to 65 wt-%, and most preferably about 61 wt-% to 62 wt-%.

Additionally, the dough of the invention may comprise plasticizer such as a fat or fat substitute present in the form of any number of natural or synthetic oils including various vegetable oils such as corn oil, soy bean oil and the like. Also useful for defining the fat content of the dough of the invention are oils derived from animals such as shortening or lard as well as synthetic plasticizers such as propylene glycol or glycerol. The fat content of the dough of the invention can generally range from about 10 wt-% to 35 wt-%, preferably about 15 wt-% to 30 wt-%, and most preferably about 20 wt-% to 25 wt-% to optimize bread layer texture and minimize toughness and hardness after pre-baking.

The dough of the invention may also comprise water. Preferably, the dough moisture will range from about 0 wt-% to 50 wt-%, preferably from about 2 wt-% to 30 wt-%, and most preferably about 5 wt-% to 10 wt-% to limit the decrease in crispness often occurring with excessive amounts of water.

Another means of measuring the concentration of water is in terms of the ratio of water to flour in the dough. To this end, we have found that a water to flour ratio of about 0 to 0.5, preferably about 0.1 to 0.3, and most preferably 0.1 to 0.2 to be most conducive to optimal crispness.

Along with other constituents, the dough of the invention may also comprise a leavening agent. We have found that the stressed crispness of the composition of the invention generally increases after microwaving as the dough specific volume is increased due to the addition of leavening agents. The leavening agent may be present in the dough composition at concentrations ranging from about 0 wt-% to 3 wt-%, preferably about 0.5 wt-% to 2 wt-%, and most preferably about 1 wt-% to 2 wt-%.

Leavening agents useful in the invention include air, steam, yeast and baking powders such as those containing sodium bicarbonate and the combination of one or more baking acids with sodium bicarbonate. Baking acids useful for chemical leavening in dough mixtures include monocalcium phosphate monohydrate, sodium aluminum sulfate, sodium acid pyrophosphate, sodium aluminum phosphate, dicalcium phosphate, glucono-delta lactone, and potassium hydrogen tartrate, and mixtures thereof. One or more baking acids may be combined with the sodium bicarbonate to form the chemical leavening agent. Preferably, the dough of the invention comprises from about 0.3 wt-% to 0.7 wt-% sodium bicarbonate.

Along with the leavening agent, the dough of the invention may also comprise any number of other constituents as known to those skilled in the art including sugar, salt, emulsifiers, dyes, flavorants, and other constituents.

Emulsifiers may be incorporated into the dough to influence texture and homogeneity of the dough mixture, to increase dough stability, to improve eating quality, and to prolong palatability. Emulsifiers aid in the incorporation and retention of air into the dough, and have an effect on the subdivision of the air cell so as to effect the final grain and volume of the cooked dough layer.

Emulsifying agents which may be used include mono- and di-glycerides of fatty acids, propylene glycol mono- and di-esters of fatty acids, glycerol-lacto esters of fatty acids, ethoxylated mono- and di-glycerides, lecithin, or equivalents thereof, and mixtures thereof. Emulsifying agents may be used singly or in combination. Preferred emulsifiers include mixtures of propylene glycol, mono- and di-esters of fatty acids plus mono- and di-glycerides and lecithin, or single mono- and di-glycerides.

Among the optional ingredients which may be added to the dough mixture are dough relaxants, mold inhibitors (antimycotics), various enriching ingredients, and shortening. Dough relaxers such as 1-cysteine, may be added to facilitate sheeting of the dough particularly with industrial size equipment. Mold inhibitors aid in extending the shelf life of the foodstuff product and may include sodium bean salts of propionic and sorbic acids, sodium diacetate, vinegar, monocalcium phosphate, lactic acid, and mixtures thereof.

Enrichment nutrients which may be added to the dough may include thiamine, riboflavin, niacin, iron, calcium, and mixtures thereof. Shortening such as animal and vegetable fats and oils may be added as a tenderizer, preservative, and to build air cell structure to provide a dough with a desirable mouthful. Other ingredients which may be optionally added to the dough mixture include seasonings, extenders, preservatives, and food colorings as desired.

The Crisping Agent

The invention also comprises any number of crisping agents deposited over the composition of the invention before the pre-baking step. Applicants have found that the addition of a crisping agent assists in avoiding sogginess and facilitates the provision of crispness in the final microwave product. Applicants have found that the use of such a crisping agent through pre-baking reduces the effect of stress that may result from freeze-thaw cycling and storage under refrigeration or freezing. Further, a crisping agent provides a crisp product through microwaving without the use of a microwave susceptor. Generally, crispness increases with the increasing particle size of crisping agent particles as well as the increasing concentration of these particles across the dough surface. Low density particles with large surface areas which extend away from the product surface heat and dry faster under microwaving.

The need for a special crispy layer arises because of the fundamental difference between microwave and conventional heating. In conventional heating, the high surface temperature produces a steep moisture gradient which permits the outer surface to be dry enough to be crisp while the inside is wet enough to be tender.

Generally, the invention may comprise any number of crisping agents consistent with this functionality. Preferably, the crisping agent is a material which does not wet easily and, if wet, will dry quickly with minimal energy input. Crisping agents found useful in accordance with the invention include processed and unprocessed nuts, grains, seeds, and bread crumbs as well as any number of other processed or unprocessed synthetic or natural compositions or compositional mixtures.

Generally, the crisping agent may be affixed to the dough of the invention through any number of means including, for example, an aqueous based starch slurry, egg albumen, a solution of sugar, etc. In fact, any composition which will not overly wet the crisping agent may be used to adhere this agent to the dough composition including the oil and water present in the dough. We have found that crisping agent particle size and concentration most closely affect crispness. Generally, crisping agent concentrations of about 20% to 95% coverage, preferably about 50% to 95% coverage, and most preferably about 80% to 95% coverage per square inch have been found to provide optimal crispness. Further, crisping agent particle sizes ranging from about 1 mm to 7 mm, preferably about 3 mm to 6 mm, and most preferably about 4 mm to 5 mm provide optimal crispness.

In accordance with a preferred aspect of the invention, the crisping agent comprises Japanese style bread crumbs being a particle size ranging from about 3 mm to 7 mm. Dispersed over the surface of the batter-coated dough at a concentration ranging from about 80% to 95% coverage per square inch.

Dough Coating

The invention may also comprise a coating useful in attaching the crisping agent to the dough. Suitable coating agents include aqueous sugar and starch slurries, egg washes including egg albumen, batter compositions, oils or fats, as well as physical means such as pressing the crisping agent into the dough as well as any other constituent capable of increasing the adhesive properties of the dough without adding excessive water to the system. When a chemical dough coating is used, it is generally present in a concentration ranging from 0.5 wt-% to 5 wt-%, and preferably 2 wt-% to 3 wt-% of the entire composition which allows for optional adhesion and limited impact on dough crispness and texture.

One means of increasing adhesion is through a batter. The batter functions to provide texture to the composition in the context of pre-baking and microwaving. Further, the batter functions to support the composition which is first pre-fried, baked and then may be frozen or otherwise placed in a storage stable environment before microwaving. As such, the batter functions to provide compositional stability after formulation as well as assist in processing through the absorption of moisture from the dough upon microwave cooking.

Generally, the batter may comprise any number of constituents consistent with this function. Exemplary batters are those disclosed in commonly assigned U.S. patent application Ser. No. 759,045, filed Sep. 5, 1991, which is incorporated herein by reference.

Fillings and Toppings

Generally, the composition of the invention may also comprise a filling or topping. The filling or topping functions to provide any number of qualities to the composition including taste or flavoring, texture, nutritional value, aesthetic appearance, among other attributes.

Preferably, toppings or fillings used with this invention have a free water content which produces less than about 3.5 cm above the filling, preferably about 0 cm to 3 cm above the filling and most preferably about 0 cm to 2.5 cm above the filling when measured using a filter paper absorbing test. The filter paper absorbing test consists of putting a filling or topping in a glass beaker, placing a rectangular piece of filter paper vertically in the beaker so that it is partially immersed in the filling or topping, covering the beaker and allowing the water to climb up the filter paper above the level of the filling for about 30 minutes. The height of the water after 30 minutes is then measured in centimeters. Applicants have found that tests run with different fillings showed that any filling in which the water rose above about 3.5 cm within 30 minutes was too wet and produced an unsatisfactory microwaveable product.

Common toppings or fillings include strudels, breakfast servings such as eggs, bacon, and cheese; fruit fillings such as cherries, strawberries, blueberries, blackberries, bananas, apples and the like; dessert fillings such as fruits, custards, chocolates, and any number of other common pie-type fillings; meat fillings including chicken, turkey, beef, and the like; vegetables such as corn, carrots, spinach, beans, peas, among others; as well as any other appropriate servings for use as appetizers, entrees, and dessert foods among other applications.

Processing

Generally, the composition of the invention may be formulated by first mixing the dough through processes known to those of skill in the art. Once the dough is formulated to the given specifications, it may be coated with an optional predusting step. The composition may then be coated with a crisping agent and then coated with the intended filling or topping. The composition of the invention may take any number of forms including a pocket bread or enclosed topping form such as a popover or pocket bread application as well as an open-face form such as a pizza.

Once topped or filled, the composition is cooked until done, generally for a time period ranging from about 0.5 minutes to over 60 minutes at temperatures ranging from about 325° F. to 425° F. The invention may then be placed in a storage stable environment such as those of reduced ambient temperature. The time and temperature of cooking will vary depending upon the size of the pastry system. We have found that the composition of the invention when pre-baked and prepared with constituents as described above, provides a stable product having the desired crispness.

WORKING EXAMPLES

The following examples further illustrate the invention. They are not meant to constitute implied limitations of the scope which is fully set forth in the foregoing text.

The various compositions of the working examples were stressed to ascertain the stability of the product and its ability to provide crispness in an actual commercial setting. Stressed crispness indicates crispness obtained in a freeze-thaw stress test. This test analyzed the crispness of a product which was manufactured, baked and froze until frozen solid. The product was then removed from the freezer and completely thawed at 40° F. The same product was then frozen and thawed two more times in this manner, frozen once again, and then microwaved. The crispness of the product was then evaluated.

The effect of dough composition on stressed crispness and liking is most easily seen in FIG. 1 which maps the composition of each of the working examples. Working examples surviving stress were most often made from low moisture/high fat doughs (region I in FIG. 1). All of the samples in FIG. 1 are mapped showing the $H_2O$/flour ratio below 0.5 and bread total fat contents above 15% produced crisp product. Acceptable products were made at higher moisture contents (region III), but progressively fewer crisp products were found as $H_2O$/flour approached 0.6.

FIG. 2 shows the total content of dough fat and moisture in each working example after cooking in comparison to several bread systems already commercially available.

Relevant information on each working example is provided below:

Working Example 1

Dough: Pastry Dough 1
Toaster strudel dough
Bread layer thickness: about 1.5 mm
Dough $H_2O$/flour ratio: 0.579
Bread layer fat content: 19.0%
Bread layer moisture: 30.5%
Filling: Toaster strudel, 30% $H_2O$, $a_w$=0.88
Crisp layer: Pizza Pocket high amylose starch batter.
Performance: Poor performance in microwave caused by thin, high moisture dough.

Working Example 2

Dough: Laminated Pizza Pocket—dry, high flour/water ratio with laminated shortening in the dough
Bread layer thickness: ≧3 mm
Dough $H_2O$/flour ratio: 0.467
Bread layer fat content: 26.0%
Bread layer moisture: 22.0%
Filling: Standard toaster strudel (same as Working Example 1)
Crisp layer: Pizza Pocket batter
Performance: Product without batter was not crisp in the microwave (absence of crisp layer); product with batter layer was crisp and survived temperature stress.

Working Example 3

Dough: Frozen buttermilk biscuit (low water/high fat);
Bread layer thickness: ≧3 mm
Dough $H_2O$/flour ratio: 0.597
Bread layer fat content: 12.0%
Bread layer moisture: 23.6%
Filling: Stabilized egg to prevent syneresis, bacon, cheese (45% $H_2O$, $a_w$=0.97)
Crisp layer: Japanese Style Bread Crumbs pressed into the dough and held by egg wash).
Performance: Good product, not exceptionally crisp, but good texture, not tough, not soggy.

Working Example 4

Breakfast Pocket with egg and bacon baked with Japanese Bread Crumbs
Dough: Pizza Pocket over 10% Fat for baked version.
Bread layer thickness: ≧3 mm
Dough $H_2O$/flour content: 0.393
Bread layer fat content: 12.0%
Bread layer moisture: Not measured
Filling: (Same as Working Example 3); Vegetables with egg, bacon, and cheese.
Crisp layer: Japanese Bread Crumbs.
Performance: Performed well in the microwave.

Working Example 5

Dough: All Ready Pie Crust (low moisture/high fat)
Bread layer thickness: ≧3 mm
Dough $H_2O$/flour ratio: 0.157
Bread layer fat content: 28%
Bread layer moisture: 21.3%
Filling: Stabilized egg to prevent syneresis, bacon, egg, mushrooms, cheese (45% $H_2O$, $a_w$=0.98).
Crisp layer: Japanese Bread Crumbs pressed into the dough.
Performance: One of the best performing microwave crisp products; high crispness after stress.

Working Example 6

Dough: Royal Danish (medium moisture/high fat)
Bread layer thickness: ≧3 mm
Dough $H_2O$/flour ratio: 0.571
Bread layer fat content: 31.0%
Bread layer moisture: 23.0%
Filling: Cherry filling (60% $H_2O$; $a_w$=0.97). This filling has a tendency to overheat in the microwave and explode creating soggy product. It also had a high bread moisture content (39% $H_2O$) after microwave that contributes to low crispness.
Crisp layer: Pizza Pocket Batter. The batter's corn flavor was not particularly compatible with the pastry.
Performance: The product was not very crisp because of the high filling moisture, overheating, leaking, and explosion of the filling in the microwave all contributed to very high bread moisture.

Working Example 7

Dough: Royal Danish
Bread layer thickness: ≧3 mm
Dough $H_2O$/flour ratio: 0.571
Bread layer fat content: 23.0%
Bread layer moisture: 26.3%
Fillings: Fruit (same as Working Example 6); chocolate; cream cheese (30% $H_2O$, $a_w$=0.88)
Crisp layer: Japanese bread crumb
Performance: Crumbs are needed to provide crispness in baked product. Fruit filled product did not survive temperature stress very well. Chocolate and cream cheese produced nice product out of the microwave.

Working Example 8

Dough: All Ready Pie Crust (low moisture/high fat)
Bread layer thickness: ≧3 mm
Dough $H_2O$/flour ratio: 0.157
Bread layer fat content: 28.0%
Bread layer moisture: 17.4%
Filling: Chicken and vegetables
Crisp layer: Japanese bread crumbs
Performance: Pie crust dough with bread crumbs performs exceptionally well in the microwave with almost any filling that does not have a lot of free water. It survived temperature stress. Crumbs are needed to produce crispness.

Working Example 9

Dough: All Ready Pie Crust
Bread layer thickness: ≧3 mm
Dough $H_2O$/flour ratio: 0.157
Bread layer fat content: 28%
Bread layer moisture: Not measured
Filling: Pizza Pocket (52% $H_2O$; $a_w$=0.96)
Crisp layer: Japanese Bread Crumbs
Performance: Crisp after stress.

Working Example 10

Dough: Pepperidge Farm® puff pastry (low moisture/high fat); laminated puff pastry dough.
Bread layer thickness: ≧3 mm
Bread layer fat content: 24.3%
Bread layer moisture: 7.4%
Filling: Chicken (same as Working Example 8)
Crisp layer: Japanese bread crumbs
Performance: This product performed well in the microwave, it was not soggy or tough.

Working Example 11

Dough: Peppridge Farm® puff pasty (same as Working Example 10)
Bread layer thickness: ≧3 mm
Dough $H_2O$/flour ratio: Not measured
Bread layer fat content: 24.3%
Bread layer moisture: 7.4%
Filling: Pizza pocket (see Working Example 9)
Crisp layer: Japanese bread crumbs
Performance: Crispness was adequate; but Pizza flavor with puff pastry dough was not a very compatible combination.

Working Example 12

Dough: Pizza Pocket dough with additional 10% fat; low fat baked dough produced an extremely tough and dry product.
Bread layer thickness: ≧3 mm
Dough $H_2O$/flour ratio: 0.467
Bread layer fat content: 15%
Bread layer moisture: 20.0%
Filling: Pizza Pocket (see Working Example 9)
Crisp layer: Japanese bread crumbs
Performance: It performs well in the microwave. Additional fat in the dough may be needed to avoid toughness.

Working Example 13

Dough: See Working Example 12
Bread layer thickness: ≧3 mm
Dough $H_2O$/flour ratio: 0.467
Bread layer fat content: 15%
Bread layer moisture: Not measured
Filling: Chicken and vegetables (Working Example 8)
Crisp layer: Japanese bread crumbs
Performance: Same as Working Example 12

Working Example 15

Dough: Pizza pocket with additional fat (10–15%), yeast leavened; low moisture. Additional fat is needed to prevent toughening.
Bread layer thickness: ≧7 mm
Dough $H_2O$/flour ratio: 0.467
Bread layer fat content: 20.0%
Bread layer moisture: 20.0%
Topping: Pizza Pocket (see Working Example 9)
Crisp layer: Japanese bread crumbs
Performance: Performs well in the microwave.

Working Example 16

Dough: Pizza Pocket dough for the top layer
Bread layer thickness: ≧7 mm
Dough $H_2O$/flour ratio: 0.464
Bread layer fat content: 20%
Bread layer moisture: 25%
Crisp Layer: Highly leavened, thin (1 mm) doughs with high amylose corn flour (30%), and high amylose corn starch (10% Hylon™ VII)
Performance: None of the samples were crisp.

Working Example 17

Dough: All Ready Pie Crust (low moisture, high fat)
Bread layer thickness: ≧3 mm
Dough $H_2O$/flour ratio: 0.157
Bread layer fat content: 28%
Bread layer moisture: 24%
Fillings: Any strudel type fruit, chocolate, cream cheese
Crisp layer: Japanese bread crumbs
Performance: All pie dough products with crumbs performed exceptionally well. Products without crumbs were not crisp.

Working Example 18

Dough: Peppridge Farm® puff pastry
Bread layer thickness: ≧3 mm
Dough $H_2O$/flour ratio: Not measured
Bread layer fat content: 24.3%
Bread layer moisture: 7.4%
Fillings: See Working Example 16
Crisp layer: Japanese bread crumbs
Performance: All sweet products performed well in microwave. Although none of them were exceptionally crisp, they were all nice products, ate very well, not soggy and not tough.

Working Example 19

Graham Cracker Pastry shells
Dough: Graham cracker
Bread layer thickness: 2–3 mm
Dough $H_2O$/flour ratio: Not measured
Bread layer fat content: 22.0%
Bread layer moisture: 12.0%
Filling: Cream cheese
Performance: Did not survive temperature stress

Working Example 20

Dough: Easy Pastry—An extremely low moisture/high fat dough (6% $H_2O$/20% fat), very thin, underdeveloped, pie crust type.
Bread layer thickness: 2 mm
Dough $H_2O$/flour ratio: 0.066
Bread layer fat content: 20%
Bread layer moisture: 6%
Filling: Standard strudel
Crisp Layer: This was the only dough that was crisp without the additional crisp layer, but when we increased the dough thickness, we started to loose crispness.
Performance: Thin dough shell was fairly crisp but slightly thicker dough lost crispness and will require bread crumbs.

Working Example 20

Dough: Chemical leavened pizza crust
Bread layer thickness: 7 mm
Dough $H_2O$/flour ratio: 0.467
Bread layer fat content: 5%
Bread layer moisture: 15.9%
Topping: Pizza (Chesse 15 g, Italian sausage 20 g and Sauce 35 g) (30% moisture, high solids aw: 0.90)
Crisp layer: Japanese bread crumbs
Performance: This product was not soggy after microwaving, but very tough and dry.

Working Example 21

Dough: Fillo dough
Bread layer thickness: 1–2 mm
Dough $H_2O$/flour ratio: 0.5
Bread layer fat content: 16.7%
Bread layer moisture: 40.4%
Filling: Pizza (Cheese 15 g, Italian sausage 20 g and Sauce 35 g) (30% moisture, high solids aw: 0.90)
Crisp layer: Japanese bread crumbs
Performance: This product survived stress; was slightly crisp; not soggy after microwaving

TABLE 1

The presence of a crisp layer has an impact on crispness. In order to develop the crisp layer we evaluated variety of breadings and batters from different manufacturers.

| Batter | Breading | Product |
|---|---|---|
| Micro Crisp (National Starch) | None | Fried Pizza |
| " | " | Pizza Pocket |
| " | " | Fried Pastry |
| " | " | Fried Savory |
| Crisp Batter (Griffith Labs) | Krusto (#8069) | Fried Pizza |
| " | " | Pizza Pocket |
| None | Krusto (20% Fat) | Baked Pizza |
| " | " | Baked Pocket |
| Ultra Crisp (Coors) | None | Fried Pizza |
| " | " | Pizza Pocket |
| " | " | Fried Pastry |
| None | Rice Crumbs 250 | Baked Pizza |
| " | Rice Crumbs 500 | Pastry |
| " | Corn Crumbs 500 | Pastry |
| " | Barley Flakes | Pastry |
| " | Barley Nuggets | Pastry |
| Batter 2171 5P90 (Newly Weds Foods) (20% Fat) | None | Baked Pizza |
| None | Japanese Style Bread Crumbs (Newly Weds Foods) | |
| " | #36729 toasted, large | Baked Pastry |
| " | #36076 not toasted, small | Baked Pastry |
| " | #35922 colored, not toasted | Baked Pastry |
| " | #5P90 (20% Fat) toasted | Baked Pastry |

The above specification, examples and data provide a complete description of the manufacture and use of the composition of the invention. Since many embodiments of the invention can be made without departing from the spirit and scope of the invention, the invention resides in the claims hereinafter appended.

We claim as our invention:

1. A microwaveable dough composition comprising:
   (a) a pre-baked dough, said pre-baked dough comprising flour, from about 5–10 wt-% water, from about 10–35 wt-% of a plasticizer, and a leavening agent;
   (b) a dough coating used to adhere a crisping agent to said pro-baked dough; and
   (c) a crisping agent, said crisping agent dispersed across the surface of said dough and adhered to the dough with use of a coating wherein crisping agent comprises bread crumbs having a particle size of 1 mm to 7 mm and said crumbs are dispersed across said dough at a concentration ranging from about 20% to 95% coverage per square inch and said microwaveable dough composition is capable of providing an outer crust layer on the surface of a microwaveable product when the product is pre-baked and subjected to microwave energy.

2. The composition of claim 1 wherein said flour dough comprises a grain constituent, said grain constituent derived from a grain selected from the group consisting of wheat, oat, rye, sorghum, barley, rice, millet, corn, and mixtures thereof.

3. The composition of claim 1 wherein said bread crumbs are dispersed across said dough at a concentration ranging from about 80% to 95% coverage per square inch and said bread crumbs have a particle size ranging from about 3 mm to 7 mm.

4. The composition of claim 2 wherein said flour has a concentration ranging from about 55 wt-% to 70 wt-%.

5. The composition of claim 1 wherein the dough coating is a batter.

6. The composition of claim 5 wherein said batter comprises high amylose flour.

7. The composition of claim 1 additionally comprising a topping.

8. A microwaveable dough composition comprising:
   (a) a pre-baked dough, said pre-baked dough comprising flour, from about 10–35 wt-% of a plasticizer, from about 5–10 wt-% water, and a leavening agent;
   (b) a dough coating used to adhere a crisping agent to said pre-baked dough;
   (c) a crisping agent dispersed across the surface of said dough; and
   (d) a topping wherein said crisping agent comprises bread crumbs and said bread crumbs are dispersed across said dough at a concentration ranging from about 80% to 95% coverage per square inch and said bread crumbs have a particle size ranging from about 3 mm to 7 mm and said microwaveable dough composition is capable of providing an outer crust layer on the surface of a microwaveable product when the product is pre-baked and subjected to microwave energy.

9. The composition of claim 8 wherein said dough comprises a grain constituent, said grain constituent derived from a grain selected from the group consisting of wheat, oat, rye, sorghum, barley, rice, millet, corn, and mixtures thereof.

10. The composition of claim 8 wherein said crisping agent is selected from the group consisting of nuts or fractions thereof, grains or fractions thereof, seeds or fractions thereof, or mixtures thereof.

11. The composition of claim 8 wherein said dough composition comprises strudel.

12. The composition of claim 8 wherein said topping is selected from the group consisting of eggs, bacon, cheese, or mixtures thereof.

13. The composition of claim 8 wherein said topping is selected from the group consisting of chicken, beef, fish, or mixtures thereof.

14. The composition of claim 8 wherein said dough comprises pizza dough and said topping comprises pizza constituent.

15. The composition of claim 8 wherein said dough composition comprises pie crust and said topping comprises strudel.

16. The composition of claim 8 wherein said dough composition comprises pocket bread.

17. A method of preparing a microwaveable dough composition, said dough composition comprising:
(a) a pre-baked dough comprising starch, from about 5–10 wt-% water, from about 10–30 wt-% of a plasticizer, and a leavening agent;
(b) a dough coating used to adhere a crisping agent to said microwaveable dough; and
(c) a crisping agent, said crisping agent dispersed across the surface of said dough;
wherein said crisping agent comprises bread crumbs and said bread crumbs are dispersed across said dough at a concentration ranging from about 80% to 95% coverage per square inch and said bread crumbs have a particle size ranging from about 3 mm to 7 mm and said microwaveable dough composition is capable of providing an outer crust layer on the surface of a microwaveable product when the product is pre-baked and subject to microwave energy; said method comprising the step of subjecting the pre-baked microwaveable dough composition to microwave energy without a microwave susceptor.

* * * * *

UNITED STATES PATENT AND TRADEMARK OFFICE
CERTIFICATE OF CORRECTION

PATENT NO. : 5,576,036
DATED : NOVEMBER 19, 1996
INVENTOR(S) : PESHECK ET AL.

It is certified that error appears in the above-identified patent and that said Letters Patent is hereby corrected as shown below:

At column 4, line 31, please delete the word "bean" after the word "sodium".

At column 4, line 40, please delete the word "mouthful" and insert therefor --mouthfeel--.

At column 9, line 59, please delete the numeral "15" and insert therefor --14--.

At column 10, line 5, please delete the numeral "16" and insert therefor --15--.

At column 10, line 17, please delete the numeral "17" and insert therefor --16--.

At column 10, line 29, please delete the numeral "18" and insert therefor --17--.

At column 10, line 43, please delete the numeral "19" and insert therefor --18--.

At column 10, line 54, please delete the numeral "20" and insert therefor --19--.

At column 11, line 67, please delete the word "pro-baked" and insert therefor --pre-baked--.

Signed and Sealed this

Sixth Day of July, 1999

*Attest:*

*Attesting Officer*

Q. TODD DICKINSON

*Acting Commissioner of Patents and Trademarks*